US009897472B2

(12) United States Patent
Raduchel et al.

(10) Patent No.: US 9,897,472 B2
(45) Date of Patent: Feb. 20, 2018

(54) WATER METERING SYSTEM

(71) Applicant: Vaughn Realty Ventures LLC, Great Falls, VA (US)

(72) Inventors: William J. Raduchel, Palo Alto, CA (US); Bradley Moser Vaughn, Burlingame, CA (US)

(73) Assignee: Vaughn Realty Ventures LLC, Great Falls, VA (US)

( * ) Notice: Subject to any disclaimer, the term of this patent is extended or adjusted under 35 U.S.C. 154(b) by 0 days.

(21) Appl. No.: 15/652,578

(22) Filed: Jul. 18, 2017

(65) Prior Publication Data
US 2018/0017421 A1 Jan. 18, 2018

Related U.S. Application Data

(60) Provisional application No. 62/363,754, filed on Jul. 18, 2016.

(51) Int. Cl.
*G08B 23/00* (2006.01)
*G01F 1/66* (2006.01)
(Continued)

(52) U.S. Cl.
CPC .............. *G01F 1/666* (2013.01); *G01F 1/696* (2013.01); *H04Q 9/00* (2013.01)

(58) Field of Classification Search
CPC . G01F 1/00; G01F 1/66; G01F 1/6882; G01F 1/7082; G01F 1/7084; G01F 5/00;
(Continued)

(56) References Cited

U.S. PATENT DOCUMENTS 5,502,652 A * 3/1996 Hoggatt .................. G01F 1/662
374/E17.007
5,986,573 A * 11/1999 Franklin ............... G01F 15/005
137/552
(Continued)

FOREIGN PATENT DOCUMENTS

EP 2840362 2/2015
JP 2005098995 4/2005

OTHER PUBLICATIONS

International Search Report in International Application No. PCT/US2017/42526, dated Oct. 3, 2017, 56 pages (with English translation).

*Primary Examiner* — Naomi J Small
(74) *Attorney, Agent, or Firm* — Fish & Richardson P.C.

(57) ABSTRACT

Methods, systems, and apparatus, including computer programs encoded on a computer storage medium, for metering water are disclosed. In one aspect, a method includes the actions of receiving, from a first meter that is connected to a first pipe, first audio data collected during a time period and first temperature data collected during the time period. The actions further include receiving, from a second meter that is connected to a second pipe, second audio data collected during the time period and second temperature data collected during the time period. The actions further include, based on the first audio data, the first temperature data, the second audio data, and the second temperature data, determining a first amount of material that has flowed through the first pipe during the time period relative to a second amount of material that has flowed through the second pipe.

20 Claims, 6 Drawing Sheets

(51) Int. Cl.
*H04Q 9/00* (2006.01)
*G01F 1/696* (2006.01)

(58) Field of Classification Search
CPC .......... G01F 1/688; G01F 1/666; G01F 1/696; H04Q 9/00
USPC .................................................... 340/870.02
See application file for complete search history.

(56) References Cited

U.S. PATENT DOCUMENTS

| | | |
|---|---|---|
| 6,178,816 B1 | 1/2001 | Katzman |
| 6,250,371 B1 * | 6/2001 | Amerman ............... F25B 30/06 165/45 |
| 6,595,071 B1 * | 7/2003 | Doten ...................... A61B 8/06 73/861.29 |
| 7,637,277 B2 | 12/2009 | Norman |
| 8,749,393 B1 | 6/2014 | Tollefson |
| 9,291,483 B2 | 3/2016 | Mikami |
| 9,574,923 B2 | 2/2017 | Williamson |
| 2006/0032317 A1 | 2/2006 | Furmidge |
| 2009/0173168 A1 | 7/2009 | Cottam |
| 2010/0231407 A1 * | 9/2010 | Carr ................... G06K 19/0723 340/691.1 |
| 2012/0305113 A1 | 12/2012 | Williamson |
| 2014/0165719 A1 | 6/2014 | Williamson |
| 2014/0192511 A1 | 7/2014 | Mikami |
| 2014/0307414 A1 | 10/2014 | Mikami |
| 2017/0307466 A1 * | 10/2017 | Brennan, Jr. ............. G01F 1/66 |

\* cited by examiner

WATER METERING SYSTEM

CROSS REFERENCE TO RELATED APPLICATION

This application claims the benefit of U.S. Application No. 62/363,754, filed on Jul. 18, 2016, which is incorporated by reference.

TECHNICAL FIELD

This specification generally relates to measuring water flow.

BACKGROUND

Water metering is the process of measuring water use. Water meters may be used to measure the volume of water used by residential and commercial buildings that are supplied with water by a public water supply system. Water meters can also be used at the water source, well, or throughout a water system to determine flow through a particular portion of the system.

SUMMARY

According to an innovative aspect of the subject matter described in this application, a method for metering water includes the actions of receiving, from a first meter that is connected to a first pipe, first audio data collected during a time period and first temperature data collected during the time period; receiving, from a second meter that is connected to a second pipe, second audio data collected during the time period and second temperature data collected during the time period; and based on the first audio data, the first temperature data, the second audio data, and the second temperature data, determining a first amount of material that has flowed through the first pipe during the time period relative to a second amount of material that has flowed through the second pipe.

These and other implementations can each optionally include one or more of the following features. The action of determining a first amount of material that has flowed through the first pipe during the time period relative to a second amount of material that has flowed through the second pipe includes the actions of determining that a first temperature of the first pipe has changed by at least a threshold temperature change during a particular amount of time; determining that a second temperature of the second pipe has changed by at least the threshold temperature change during the particular amount of time; after determining that the first temperature of the first pipe has changed by at least the threshold temperature change during the particular amount of time, determining a first elapsed time that the first temperature of the first pipe is changing; after determining that the second temperature of the second pipe has changed by at least the threshold temperature change during the particular amount of time, determining a second elapsed time that the second temperature of the second pipe is changing; and based on the first elapsed time and the second elapsed time, determining the first amount of material that has flowed through the first pipe during the particular amount of time relative to the second amount of material that has flowed through the second pipe during the particular amount of time.

The action of determining a first amount of material that has flowed through the first pipe during the time period relative to a second amount of material that has flowed through the second pipe includes the actions of based on the first audio data, determining a first level of first audio energy that corresponds to the first audio data; based on the second audio data, determining a second level of second audio energy that corresponds to the second audio data; determining that the first level of first audio energy has changed by at least a threshold energy change during the particular amount of time; determining that the second level of audio energy has changed by at least the threshold energy change during the particular amount of time; after determining that the first level of first audio energy has changed by at least the threshold energy change during the particular amount of time, determining a first elapsed time that the first level of the first audio energy has changed by at least the threshold energy change; after determining that the second level of second audio energy has changed by at least the threshold energy change during the particular amount of time, determining a second elapsed time that the second level of the second audio energy has changed by at least the threshold energy change; and based on the first elapsed time and the second elapsed time, determining the first amount of material that has flowed through the first pipe during the particular amount of time relative to the second amount of material that has flowed through the second pipe during the particular amount of time.

The first pipe and the second pipe are water pipes and the material is water. The first pipe and the second pipe are gas pipes and the material is natural gas or propane. The actions further include transmitting a request for meter data. The first and second audio data and the first and second temperature data are received in response to the request for meter data. The actions further include receiving, from the first meter, data indicating that the first meter moved during the time period; and in response to receiving the data indicating that the first meter moved during the time period, providing, for display, data indicating movement of the first meter. The actions further include receiving, from a third meter that is connected to a third pipe that feeds into the first pipe and the second pipe, flow data collected during the time period; and based on the first amount of material that has flowed through the first pipe during the time period relative to the second amount of material that has flowed through the second pipe and based on the flow data from the third meter, determining a first absolute amount of material that has flowed through the first pipe during the time period and a second absolute amount of material that has flowed through the second pipe during the time period.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user may be able to calculate water consumption of individual units of a multi-unit building without installing individual flow meters for each unit.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
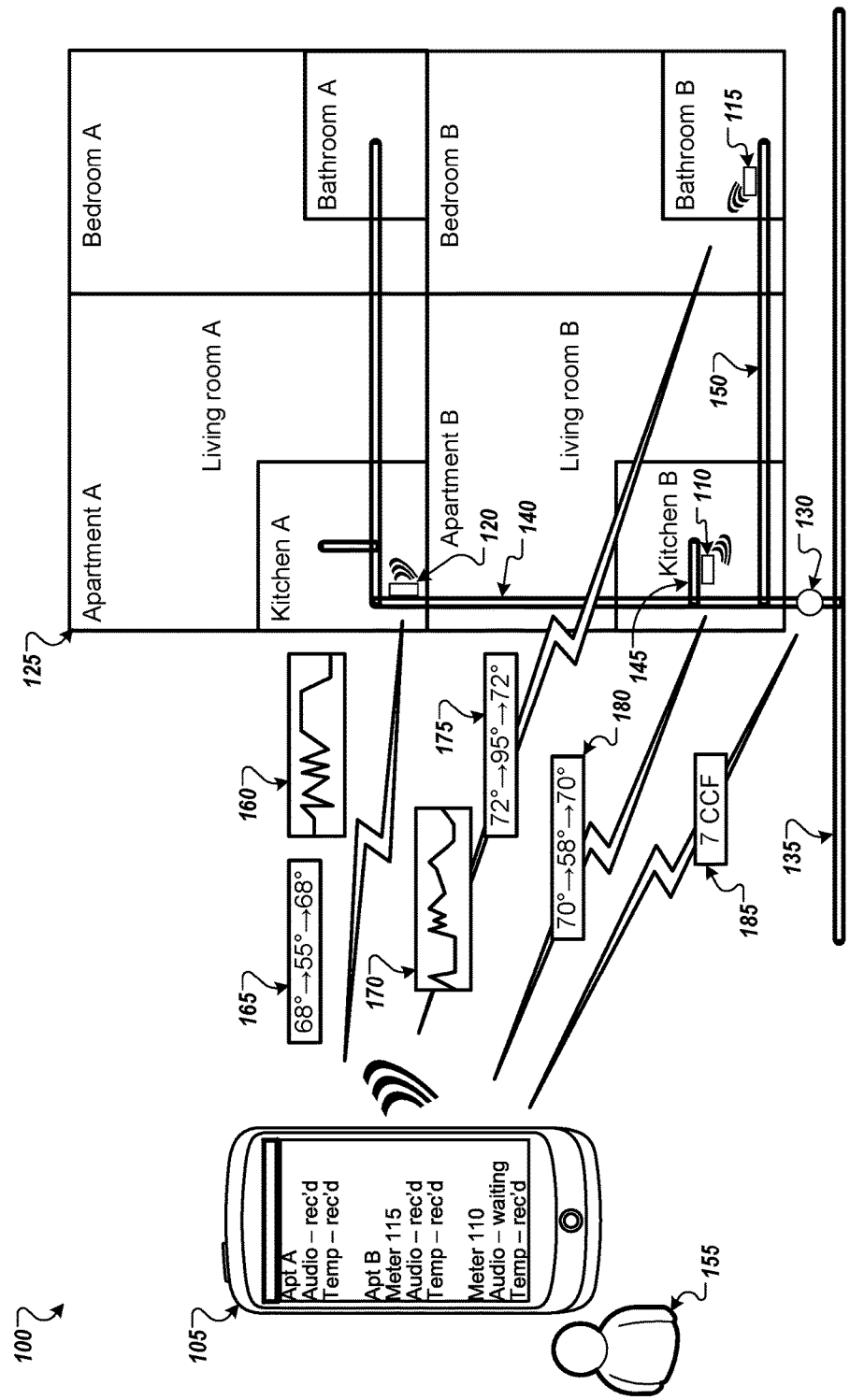
FIG. 1 illustrates an example system for collecting meter data from a plurality of meters connected to different pipes.

FIG. 1 illustrates an example system 100 for collecting meter data from a plurality of meters connected to different pipes. Briefly, and as described in more detail below, the system 100 includes a computing device 105 that collects data from surface meters 110, 115, and 120. The surface meters 110, 115, and 120 collect audio and temperature data from different pipes that are located in a multiunit building 125. The computing device 105 also collects flow data from flow meter 130. The computing device 105 processes the audio data, temperature data, and flow data to calculate the usage that corresponds to each of the surface meters 110, 115, and 120.

As illustrated in FIG. 1, the multiunit building 125 includes two apartment units, apartment A and apartment B. Apartment A has a bedroom A, bathroom A, kitchen A, and living room A. Apartment B has a bedroom B, bathroom B, kitchen B, and living room B. Neither apartment A nor apartment B has a dedicated water meter. Water pipe 140 provides water to apartment A, and a branch off water pipe 135 serves apartment B. The flow meter 130 measures the water consumption of both apartment A and apartment B without distinguishing between the usage of apartment A versus the usage of apartment B While the multiunit building 125 only includes two apartment units in this example, the multiunit building 125 may include multiple units and may be residential, commercial, or industrial space. The multiunit building 125 may have one flow meter 130 or may have multiple flow meters. For example, the multiunit building 125 may have one flow meter per floor or per tier. Additionally, the pipes may carry any type of material. For example, the pipe may provide natural gas to apartment A and apartment B.

To measure the individual water consumption of apartment A and apartment B, a plumber may install a flow meter in pipe 140. In different situations, the plumbing of the multiunit building 125 may have to be reconfigured to allow for locations where a plumber could install flow meters for each apartment. To avoid the complications of reconfiguring plumbing or cutting pipes and installing flow meters, an apartment manager 155 may attach surface meters 110, 115, and 120 to the exposed pipes in each apartment.

A surface meter 110, 115, or 120 may be configured to be attached to a pipe using tape, a clamp, or a similar fastener. It may not be necessary to cut a pipe to install a surface meter 110, 115, or 120. The surface meter 110, 115, or 120 may include a microphone, thermometer, memory, and a transceiver. The microphone may detect and record audio data in the surrounding environment. When the surface meter 110, 115, or 120 is connected to a pipe, the audio data may include the sounds of water flowing through the pipe. The thermometer may detect and record the surface temperature of the pipe.

As illustrated in FIG. 1, to estimate the water usage of apartment B, an apartment manager 155 may install a surface meter 120 on pipe 140. Because pipe 140 is the only pipe that provides water to apartment B and only apartment B, the apartment manager 155 may install one surface meter 120 for apartment B. To estimate the water usage of apartment A, the apartment manager 155 may install surface meters 110 and 115. The apartment manager 155 may install surface mater 110 on pipe 145 in the kitchen B and install surface meter 115 on pipe 150 in the bathroom B. In some instances, the apartment manager 155 may install multiple surface meters in a bathroom. For example, without access to a pipe that provides water to all of the bathroom sink, toilet, and shower, an apartment manager 155 may install a surface meter at each of the sink, toilet supply, and shower head.

Each surface meter 110, 115, or 120 may record the audio and temperature of the corresponding pipe at periodic intervals, for example, every second. Each surface meter 110, 115, or 120 may be battery powered and be able to run for an extended period of time without new batteries. For example, a surface meter 110, 115, or 120 may be able to run on a set of batteries for a year.

A surface meter 110, 115, or 120 may be configured to receive a request for data from computing device 105. To conserve battery power, a surface meter 110, 115, or 120 may activate a corresponding transceiver for a particular period. For example, a surface meter 110, 115, or 120 may activate the transceiver for two days each month. During those two days, the surface meter 110, 115, or 120 is able to receive request for data. In response to a request, the surface meter 110, 115, or 120 may transmit the stored temperature data and the stored audio data. The surface meter 110, 115, or 120 may delete the stored temperature data and the stored audio data after transmitting to the computing device 105. Limiting the window during which the surface meter 110, 115, or 120 is able to receive and transmit data preserves battery power.

While using bathroom A and kitchen A, the resident draws water through pipe 140. The surface meter 120 may continuously record the audio data and temperature of pipe 140. The temperature of pipe 140 may change as water flows through it, and the water may generate sound waves as the water moves through the pipe 140. While using bathroom B, the resident draws water through pipe 150. Similar to surface meter 120, the surface meter 115 records the audio data and temperature of the pipe 150 to which it is attached. While using kitchen B, the resident draws water through pipe 145. The water changes the temperature of pipe 145 and generates sound waves as the water moves through pipe 145.

In some implementations, apartment A and apartment B may have separate incoming water pipes for both hot and cold water. In this instance an apartment manager 155 may add surface meters to each of the hot water pipes to measure the hot water used by the resident of each apartment. For example, if surface meter 120 is attached to a cold water pipe, then the apartment manager 155 may add a surface meter to the corresponding hot water pipe. In some implementations, an apartment may have an individual hot water heater. In this case, the apartment manager 155 may add a surface meter to the inlet or outlet to the hot water gather data related to hot water usage.

During the window where the transceivers of the surface meters 110, 115, and 120 are active, the apartment manager 155 may move around the multiunit building 125 with computing device 105. The computing device 105 may include an application that communicates with the surface meters 110, 115, and 120. The application may activate a short range radio or other similar wireless communication module of computing device 105. The application may request data from each of the surface meters 110, 115, and 120. The application may request data using a unique identifier for each of the surface meters 110, 115, and 120. During installation of each of the surface meters 110, 115, and 120, the apartment manager may store the location of each surface meter with the application. While moving around the multiunit building 125, the computing device 105 may determine its location using a location sensor, such as GPS, and ping the nearby surface meters.

The computing device 105 collects data from surface meter 110 by transmitting a request for data from surface meter 120. In response, the surface meter 120 transmits audio data 160 and temperature data 165. The computing device 105 receives the data 160 and 165, stores the data 160 and 165, and tags the data 160 and 165 with data identifying surface meter 120 and the current time period. In some implementations, the computing device 105 may display on the user interface that the computing device 105 received the audio data 160 and temperature data 165. In some implementations, the computing device 105 may transmit a signal to the surface meter 120 indicating that it successful received the data. The surface meter 120 may then delete the audio data 160 and temperature data 165. The surface meter 120 may also deactivate its transceiver until the next specified time period, even if some time remains during the current time period.

The computing device 105 collects data from surface meter 110 by transmitting a request for data from surface meter 110. In response, the surface meter 110 transmits audio data 170 and temperature data 175. The computing device 105 receives the data 170 and 175, stores the data, and updates the user interface.

The computing device 105 collects data form surface meter 115 by transmitting a request for data from surface meter 110. The surface meter 115 may transmit temperature data 180. The computing device 105 receives the data 180, stores the data, and updates the user interface. The surface meter 115 may not be able to transmit any audio data. The transceiver of the surface meter 115 or the transceiver of the computing device 105 may encounter an error. In this instance, the computing device 105 may indicate that the audio data for surface meter 115 is still outstanding. The computing device 105 may send additional requests to the surface meter 115 for audio data.

In some implementations, the computing device 105 may connect wirelessly with the flow meter 130. In this instance, the flow meter may transmit flow data 185 to the computing device 105 indicating that seven CCFs flowed through the flow meter 130.

The computing device 105 or a server may process the received audio and temperature data to determine the relative water usage of apartments A and B. In some implementations, the computing device 105 may calculate a ratio of the water usage of apartment A to the water usage of apartment B. The computing device may use the ratio and the flow data 185 to calculate the absolute usage of each apartment A and B. Additionally details related to calculating water usage are discussed in relation to FIGS. 4 and 5. In some implementations, the usage readings may not be exact because the surface meters 110, 115, and 120 may not be as accurate as a flow meter.

Figure 2:
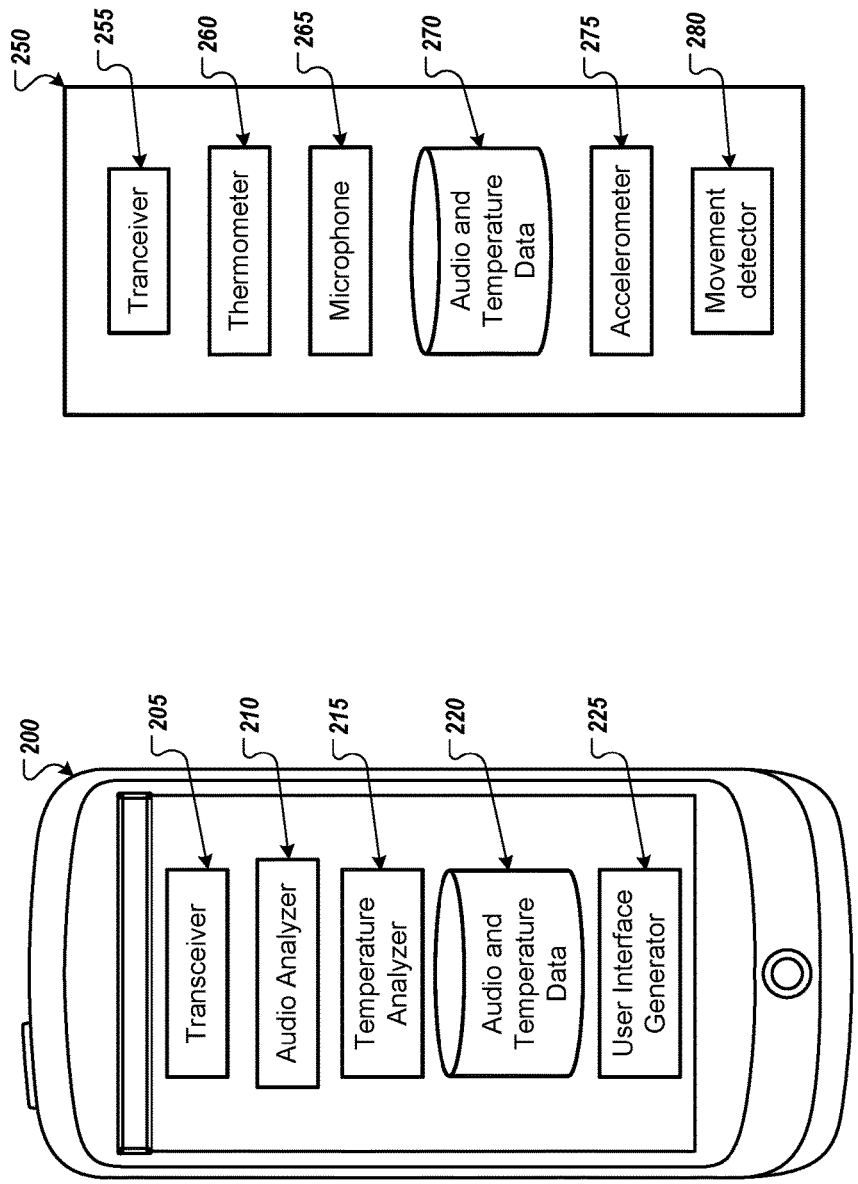
FIG. 2 illustrates an example system for processing meter data and an example device for collecting meter data from a pipe.

FIG. 2 illustrates an example system 200 for processing meter data and an example device 250 for collecting meter data from a pipe. Briefly, and as described in more detail below, the system 200 may be configured to request temperature data and audio data from device 250. The system 200 may be similar to computing device 105 of FIG. 1. The device 250 may be similar to the surface meters 110, 115, and 120 of FIG. 1.

The system 200 includes a transceiver 205. The transceiver 205 may be a short range radio module that is capable of transmitting and receiving data wirelessly. The transceiver 205 may receive data form device 250 and transmit and receive data from a server that is located in the cloud.

The system 200 includes an audio analyzer 210 and temperature analyzer 215. The audio analyzer 210 and temperature analyzer 215 may analyze the audio data and the temperature data received from device 250 and other similar devices. The system 200 may use the audio analyzer 210 and temperature analyzer 215 to generate relative water usage data or water usage ratios. The audio analyzer 210 and temperature analyzer 215 may use the processes discussed in relation to FIGS. 4 and 5. In some implementations, the audio analyzer 210 and temperature analyzer 215 may use flow data from an in-pipe meter to determine absolute water usage data.

The system 200 includes an audio and temperature data storage 220. The audio and temperature data storage 220 may be configured to store the audio and temperature data received from the device 250 and other similar devices. The audio and temperature data storage 220 may include a field for the particular device that provided the data and a field for the time period for which the device 250 collected the data.

The system 200 includes a user interface generator 225. The user interface generator 225 may be configured to provide, for display, on a screen of the system 200 a visual indication of the device 250 and other similar devices that have provided audio and temperature data and flow meters that have provided flow data to the system 200. The user interface generator 225 may be configured to display results of the water usage calculations performed by the audio analyzer 210 and temperature analyzer 215.

The device 250 includes a transceiver 255. The transceiver 255 may be a short range radio module that is capable of transmitting and receiving data wirelessly. The transceiver 255 may be active for a specified period. For example, the transceiver 255 may only be active during the first two days of a month. During other times, the transceiver 255 may be inactive to save battery power.

The device 250 includes a thermometer 260 and a microphone 265. The device 250 may be configured to be attached to a pipe. The portion of the device 250 that faces the pipe may include the thermometer 260 and microphone 265. The device 250 may sample the audio data received by the microphone 265 at periodic intervals, such as every five hundred milliseconds. The device 250 may sample the temperature detected by the thermometer 260 at periodic intervals, such as every three seconds.

The device 250 may store the sampled temperature and audio data in the audio and temperature data storage 270. The device 250 may record timing data in the audio and temperature data storage 270 to indicate the time at which the corresponding sample was collected. The device 250 may store the temperature and audio data in the audio and temperature data storage 270 until the data is successfully transmitted to the system 200.

For security purposes, it may be helpful for the device 250 to detect when it has been moved. The device 250 may include an accelerometer 275. The accelerometer 275 or other similar motion sensor may provide motion data to the movement detector 280. The movement detector 280 may store data indicating the time when the device 250 moved. Additionally or alternatively, the device 250 may include a speaker and activate an alarm when moved. Any stored movement data may be transmitted to the system 200 when the transceiver 255 is active and receives a request from the device 250.

As security example, a resident may move the device 250 from one bathroom to another bathroom that the resident rarely uses. The resident may wish to have the device 250 measure temperature and audio data at a pipe that doesn't have water flowing through it as frequently as other pipes in the resident's unit. The movement detector 280 may receive motion data from the accelerometer 275 and determine that the device 250 has moved more than would be expected if the device 250 remained on the original pipe. The device 250 may transmit the time of the movement to the system 200.

Figure 3:
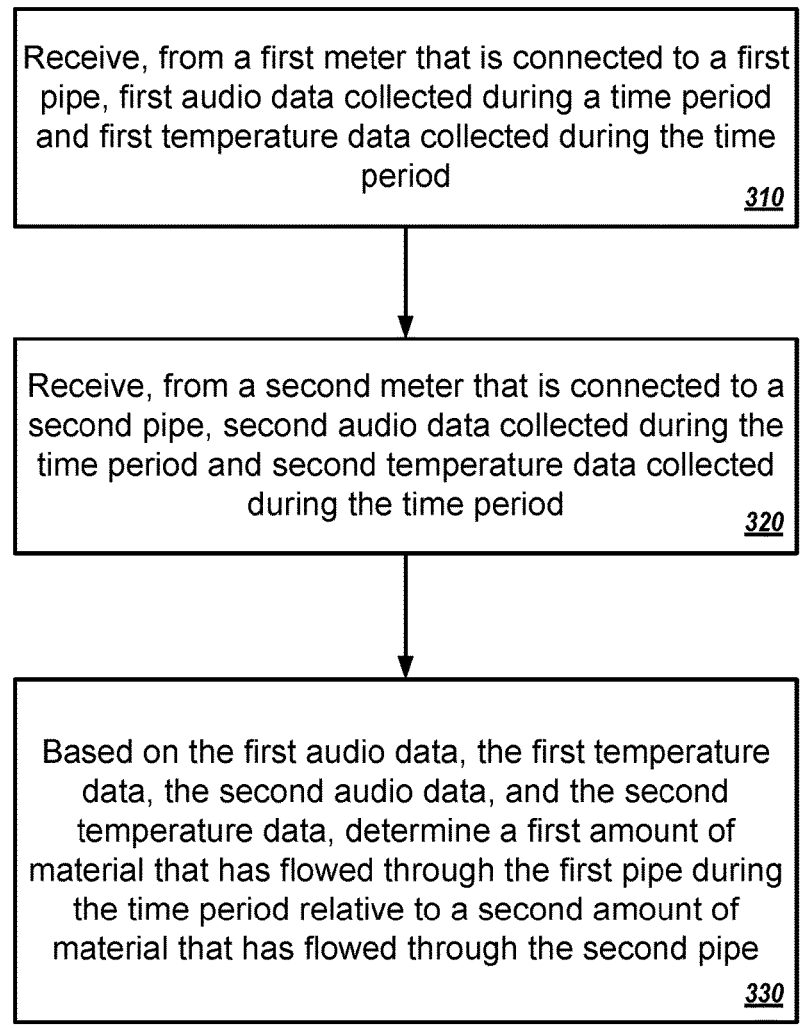
FIG. 3 illustrates an example method for processing meter data to determine relative usage.

FIG. 3 illustrates an example method 300 for processing meter data to determine relative usage. In general, the method 300 determines the relative flow between two pipes using audio data and temperature data recorded at the pipes. The method 300 will be described as being performed by a computer system comprising one or more computers, for example, the computing device 105 as shown in FIG. 1 or the computing system 200 as shown in FIG. 2.

The system receives, from a first meter that is connected to a first pipe, first audio data collected during a time period and first temperature data collected during the time period (310). In some implementations, the first pipe is a water pipe. In some implementations, the first pipe is a gas pipe. In some implementations, the system transmits a request, to the first meter, for audio and temperature data. The first meter transmits the audio and temperature data in response to that request.

The system receives, from a second meter that is connected to a second pipe, second audio data collected during the time period and second temperature data collected during the time period (320). In some implementations, the second pipe is a water pipe. In some implementations, the second pipe is a gas pipe. In some implementations, the system transmits a request, to the second meter, for audio and temperature data. The second meter transmits the audio and temperature data in response to that request.

In some implementations, the system receives data indicating that the first meter or the second meter moved. The system may display data to a user indicating that one of the meters may have moved. The system may indicate the location of the moved meter in instances where the system receives location data from the moved meter. In some implementations, the system may only receive relative movement data. The system may combine the relative movement data with data related to the original location of the meter to determine the new location. For example, the system may receive data that the system moved ten meters. The system may know that the meter was is bathroom A and kitchen A is about ten meters from bathroom A in the same unit. The system may estimate that the moved meter may be in kitchen A.

The system, based on the first audio data, the first temperature data, the second audio data, and the second temperature data, determines a first amount of material that has flowed through the first pipe during the time period relative to a second amount of material that has flowed through the second pipe (330).

In some implementations, the system determines that a first temperature of the first pipe has changed by at least a threshold temperature change during a particular amount of time. The system determines that a second temperature of the second pipe has changed by at least the threshold temperature change during the particular amount of time. The system, after determining that the first temperature of the first pipe has changed by at least the threshold temperature change during the particular amount of time, determines a first elapsed time that the first temperature of the first pipe is changing. The system, after determining that the second temperature of the second pipe has changed by at least the threshold temperature change during the particular amount of time, determines a second elapsed time that the second temperature of the second pipe is changing. The system, based on the first elapsed time and the second elapsed time, determines the first amount of material that has flowed through the first pipe during the particular amount of time relative to the second amount of material that has flowed through the second pipe during the particular amount of time.

In some implementations, the system determines, based on the first audio data, determining a first level of first audio energy that corresponds to the first audio data. The system, based on the second audio data, determines a second level of second audio energy that corresponds to the second audio data. The system determines that the first level of first audio energy has changed by at least a threshold energy change during the particular amount of time. The system determines that the second level of audio energy has changed by at least the threshold energy change during the particular amount of time. The system, after determining that the first level of first audio energy has changed by at least the threshold energy change during the particular amount of time, determines a first elapsed time that the first level of the first audio energy has changed by at least the threshold energy change. The system, after determining that the second level of second audio energy has changed by at least the threshold energy change during the particular amount of time, determines a second elapsed time that the second level of the second audio energy has changed by at least the threshold energy change. The system, based on the first elapsed time and the second elapsed time, determines the first amount of material that has flowed through the first pipe during the particular amount of time relative to the second amount of material that has flowed through the second pipe during the particular amount of time.

In some implementations, the system receives, from a third meter that is connected to a third pipe that feeds into the first pipe and the second pipe, flow data collected during the time period. The system, based on the first amount of material that has flowed through the first pipe during the time period relative to the second amount of material that has flowed through the second pipe and based on the flow data from the third meter, determines a first absolute amount of material that has flowed through the first pipe during the time period and a second absolute amount of material that has flowed through the second pipe during the time period.

The subject matter described below relates to a method of measuring flow rates in a pipe. The method involves using a thermometer to measure the temperature of the outside of a pipe. A computing device collects the temperature data and determines a flow rate through the pipe based on the changes in the temperature. Another method involves using a microphone to collect audio data on the outside of the pipe. A computing device collects the audio data and determines a flow rate through the pipe based on the changes in the audio data. In some implementations, a computing device may use both audio data and temperature to determine the flow rate through the pipe. In some implementations, a computing device may use temperature to detect when flow starts through a pipe and audio data to detect when flow stops, or vice versa.

Figure 4:
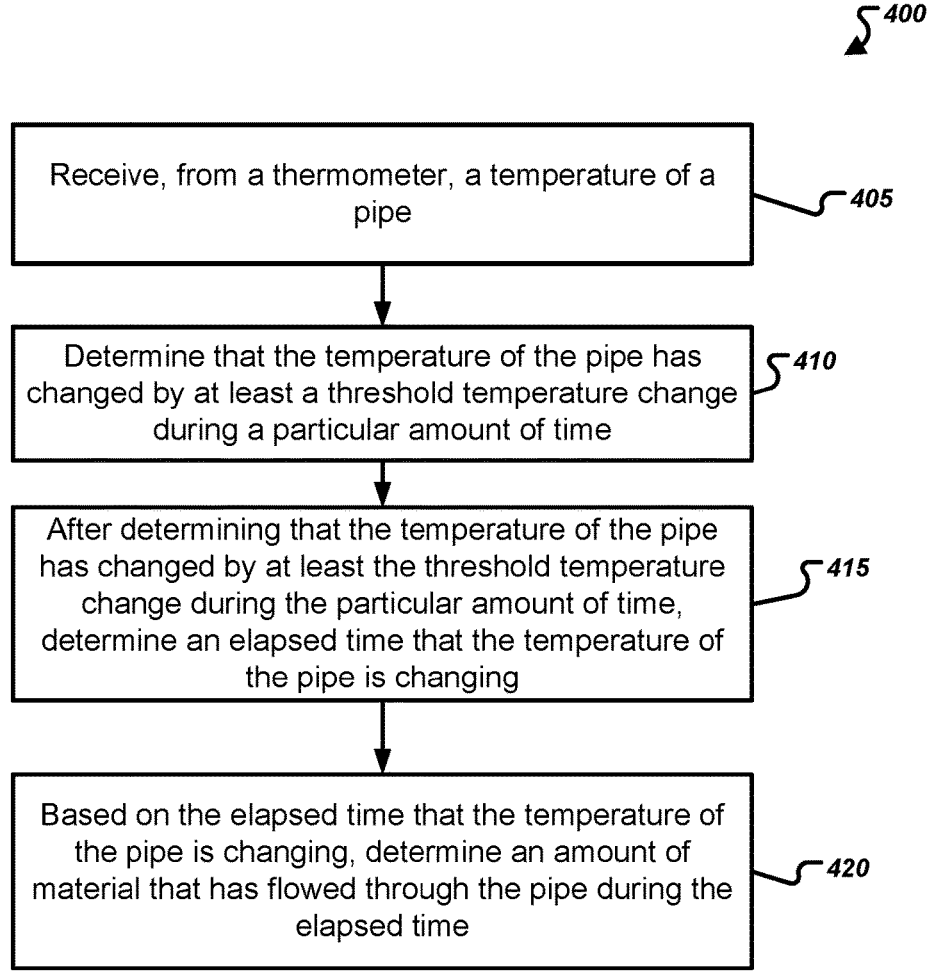
FIG. 4 illustrates an example method to measure a flow rate through a pipe using a thermometer.

FIG. 4 illustrates an example method 100 to measure a flow rate through a pipe using a thermometer. The method 100 may be performed by a computing that is located near the pipe such as a computing device that is directly connected to the thermometer. Alternatively, the method 100 may be performed by a computing device that receives data from the thermometer over a wireless connection.

The computing device receives, from a thermometer, a temperature of a pipe (405). In some implementations, the pipe is a water pipe or a pipe that provides another liquid. In some implementations, the pipe is a gas pipe that provides any type of gas such as methane. The thermometer is attached to the outside of the pipe and is configured to measure the temperature of the pipe itself. The thermometer may be covered in insulation to reduce the effect of the surrounding air on the temperature reading. In some implementations, multiple thermometers a placed on a portion of a pipe. For example, a first thermometer may detect the temperature of the pipe at one foot from the wall. A second thermometer may detect the temperature of the pipe also at one foot from the wall but at a different location on the circumference of the pipe. A third thermometer may detect the temperature of the pipe two feet from the wall or one foot from where the pipe next branches off.

The computing device determines that the temperature of the pipe has changed by at least a threshold temperature change during a particular amount of time (410). As the computing device monitors the temperature, the computing device determines a difference between temperature readings at predetermined intervals, for example, one minute. The computing device determines the threshold temperature change based on a calibration process. In some implementations, the calibration process may be based on the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe, then the computing device may monitor for a threshold temperature change of two degrees. In some implementations, the calibration process is based on training data that includes temperature readings of the pipe and flow data through the pipe. For example, during a setup process of the thermometer, the computing device receives temperature data from the thermometer and flow data from another meter that is measuring the flow rate through the pipe. Using the temperature and flow rate data, the computing device determines an appropriate threshold temperature change to detect. In some implementations, the threshold temperature change may be different depending on whether the temperature is increasing or decreasing. For example, the threshold temperature change may be two degrees if the temperature is increasing and three degrees if the temperature is decreasing.

After determining that the temperature of the pipe has changed by at least the threshold temperature change during the particular amount of time, the computing device determines an elapsed time that the temperature of the pipe is changing (415). During this stage, computing device may monitor the temperature of the pipe at shorter intervals, for example, three seconds. The computing device may determine that the temperature of the pipe is no longer changing if the temperature does not change by at least a threshold within the shorter interval or another interval. For example, the computing device may determine that the temperature has stopping changing if it measures temperatures of 50.1 degrees at a particular time and 50.2 degrees at the particular time plus two minutes. If the temperature changes from 50.1 degrees at a particular time and 50.2 degrees at the particular time plus one minute, then the computing device determines that the temperature is still changing.

Based on the elapsed time that the temperature of the pipe is changing, the computing device determines an amount of material that has flowed through the pipe during the elapsed time (420). To compute the flow rate or material that has flowed through the pipe during the elapsed time, the computing device uses the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe and the temperature changed from 50.0 degrees to 45.0 degrees during a ten minute period, then the computing device determines that thirty gallons flowed through the pipe. In some implementations, the computing device determines the amount of material that has flowed through the pipe during the elapsed time based on the training data collected during the calibration process.

In some implementations, the computing device stores data related to the flow rate through the pipe and provides the data to other computing devices in response to requests. For example, a billing device may be generating bills for water customers. The billing device sends requests to the computing devices with the flow rate data. The computing devices with the flow rate data authenticate the request and, if authenticated, providing the billing device with the flow rate data. The billing device may then generate bills to provide to the customers.

In some implementations, the computing device may use the multiple thermometer configuration to determine flow rate by determining when all of the measurements from the multiple thermometers satisfy the threshold changes or a majority of the measurements satisfy the threshold changes. For example, if two of the three temperatures change by a threshold temperature change, then the computing device may begin monitoring the temperatures at a more frequent intervals or only the temperatures from the thermometers that satisfied the threshold. In some implementations, each thermometer has a different threshold temperature change based on either the characteristics of the pipe at the thermometer or based on training data or both.

Once the liquid or gas has been flowing through the pipe for a period of time, the temperature of the pipe reaches a steady state. During this time, the computing device monitors the temperature of the pipe and determines the elapsed time that the pipe is at a constant temperature. Once the liquid or gas stops flowing the temperature of the pipe will return to the original temperature. Therefore, if the computing device measures the time that elapses between the pipe reaching a constant temperature and the pipe returning to the original temperature, the computing device can determine the flow rate through the pipe during the elapsed time.

In some implementations, the threshold temperature change that the computing device detects once the temperature of the pipe reaches a steady state is the same as the threshold temperature change detects when gas or liquid initially began flowing. In some implementations, the threshold temperature changes are different with either one being greater depending on the material of the pipe, the outer diameter of the pipe, the inner diameter of the pipe, and the material flowing through the pipe or the training data or both.

In some implementations, the amount of time that the computing device monitors for the threshold temperature change that the computing device detects once the temperature of the pipe reaches a steady state is the same as the amount of time that the computing device monitors for threshold temperature change when gas or liquid begins flowing. In some implementations, the two time periods are different and are based on the material of the pipe, the outer diameter of the pipe, the inner diameter of the pipe, and the material flowing through the pipe or the training data or both.

Figure 5:
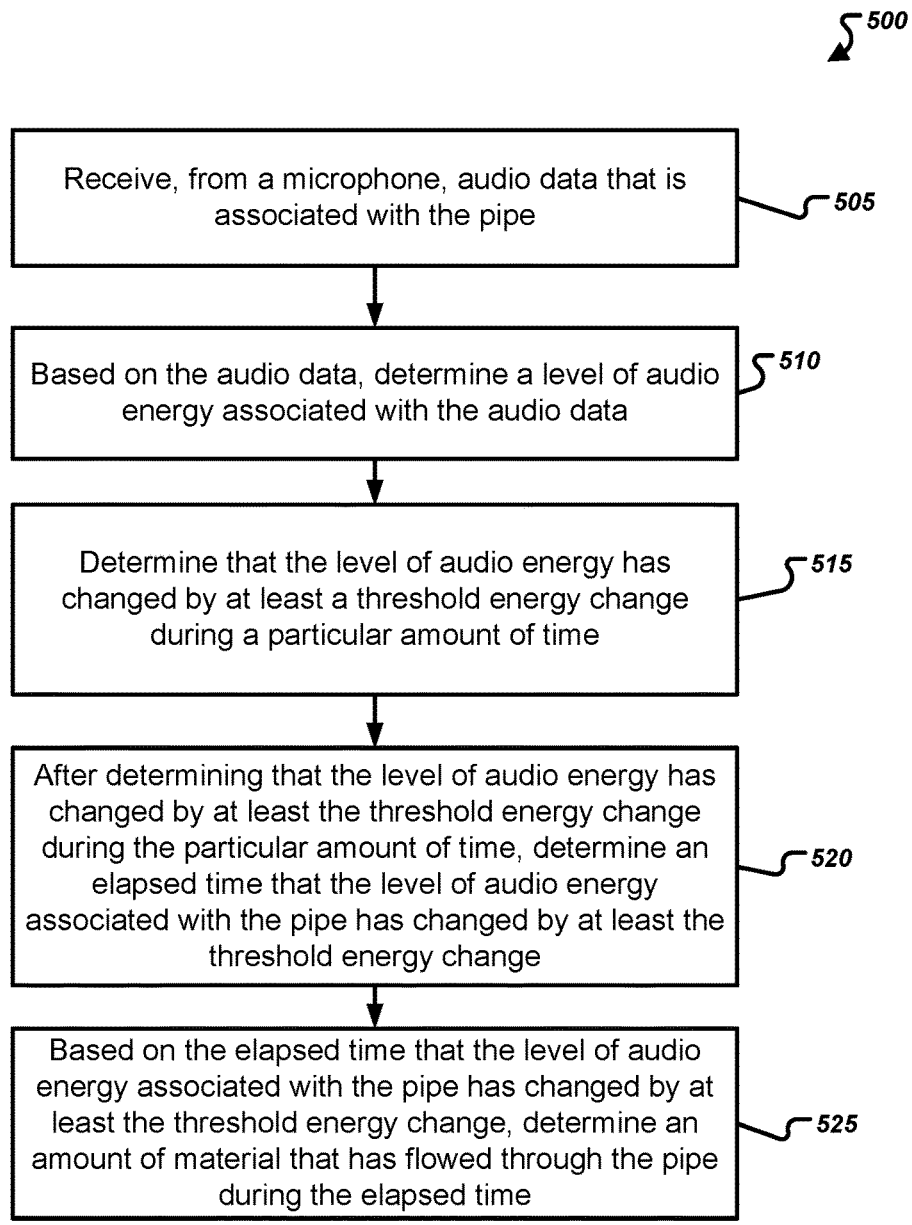
FIG. 5 illustrates an example method to measure a flow rate through a pipe using a microphone.

FIG. 5 illustrates an example method 500 to measure a flow rate through a pipe using a microphone. The method 500 may be performed by a computing that is located near the pipe such as a computing device that is directly connected to the microphone. Alternatively, the method 500 may be performed by a computing device that receives data from the microphone over a wireless connection.

The computing device receives, from a microphone, audio data that is associated with the pipe (505). In some implementations, the pipe is a water pipe or a pipe that provides another liquid. In some implementations, the pipe is a gas pipe that provides any type of gas such as methane. The microphone is attached to the outside of the pipe and is configured to measure the sound waves emitted from the pipe itself. The microphone may be covered in insulation to reduce the effect of the ambient noise on the microphone. In some implementations, multiple microphones a placed on a portion of a pipe. For example, a first microphone may detect the sound waves emitted from the pipe at one foot from the wall. A second microphone may detect the sound waves emitted from the pipe also at one foot from the wall but at a different location on the circumference of the pipe. A third microphone may detect the sound waves emitted from the pipe two feet from the wall or one foot from where the pipe next branches off. The computing device may use audio data from multiple microphones to cancel out noise.

Based on the audio data, the computing device determines a level of audio energy associated with the audio data (510). As the computing device receives audio data, the computing device converts the audio data to a level of audio energy. In some implementations, the computing device calculates the root mean square or the average amplitude of the audio data to determine the level of audio energy. In some implementations, the computing device determines the frequency components of the audio data and uses the frequency components to determine the flow rate of the pipe.

The computing device determines that the level of audio energy has changed by at least a threshold energy change during a particular amount of time (515). As the computing device computes the level of audio energy, the computing device determines a difference between levels of audio energy at predetermined intervals, for example, one minute. The computing device determines the threshold energy change based on a calibration process. In some implementations, the calibration process may be based on the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe, then the computing device may monitor for a threshold energy change of two decibels. In some implementations, the calibration process is based on training data that includes audio energy levels of the pipe and flow data through the pipe. For example, during a setup process of the microphone, the computing device receives audio data from the microphone and flow data from another meter that is measuring the flow rate through the pipe. Using the audio data and flow rate data, the computing device determines an appropriate threshold energy change to detect. In some implementations, the threshold energy change may be different depending on whether the audio energy level is increasing or decreasing. For example, the threshold energy change may be two decibels if the audio energy level is increasing and three decibels if the audio energy level is decreasing.

After determining that the level of audio energy has changed by at least the threshold energy change during the particular amount of time, the computing device determines an elapsed time that the level of audio energy associated with the pipe has changed by at least the threshold energy change (520). During this stage, computing device may compute the audio energy level of the pipe at shorter intervals, for example, three seconds. The computing device may determine that the audio energy level of the pipe is no longer outside the threshold energy change if the audio energy level fails to satisfy the threshold within the shorter interval or another interval. For example, the computing device may determine that the audio energy level no longer surpasses the threshold of three decibels if it measures an energy change of 1.7 decibels at a particular time and 1.8 decibels at the particular time plus two minutes. If the energy level change is 1.7 decibels at a particular time and 2.2 decibels at the particular time plus one minute, then the computing device determines that the audio energy level is still outside of the threshold energy range.

Based on the elapsed time that the level of audio energy associated with the pipe has changed by at least the threshold energy change, the computing device determines an amount of material that has flowed through the pipe during the elapsed time (525).

To compute the flow rate or material that has flowed through the pipe during the elapsed time, the computing device uses the material of the pipe, the outer diameter of the pipe, the inner diameter of the pipe, and the material flowing through the pipe. For example, if the pipe is copper, the outer diameter is one inch, the inner diameter is 0.8 inches, and water is flowing through the pipe and the audio energy level was outside of the threshold energy range during a ten minute period, then the computing device determines that thirty gallons flowed through the pipe. In some implementations, the computing device determines the amount of material that has flowed through the pipe during the elapsed time based on the training data collected during the calibration process.

In some implementations, the computing device factors in the level that the audio energy changes to determine flow rate. Instead of only considering whether the audio energy level either satisfies or does not satisfy the threshold energy level, the computing device may consider the level of the audio energy change. For example, an audio energy change of one decibel may correspond to eighty percent the water flowing through the pipe as a two decibel audio energy change. The computing device may consider the material of the pipe, the outer diameter of the pipe, the inner diameter of the pipe, and the material flowing through the pipe or training data or both to determine what flow rates correspond to what audio energy changes.

In some implementations, the computing device may receive audio energy level data and temperature data to determine the flow rate through the pipe. For example, the computing device may average flow rates determined based on the temperate data and based on the audio energy level data to determine the flow rate through the pipe.

In some implementations, the computing device stores data related to the flow rate through the pipe and provides the data to other computing devices in response to requests. For example, a billing device may be generating bills for water customers. The billing device sends requests to the computing devices with the flow rate data. The computing devices with the flow rate data authenticate the request and, if authenticated, providing the billing device with the flow rate data. The billing device may then generate bills to provide to the customers.

In some implementations, the computing device may use the multiple microphone configuration to determine flow rate by determining when all of the energy levels computed from data from the multiple microphones satisfy the threshold changes or a majority of the energy levels satisfy the threshold changes. For example, if two of the three energy levels change by a threshold energy change, then the computing device may begin monitoring the microphones at a more frequent intervals or only the microphones associated with the energy levels that satisfied the threshold. In some implementations, each microphone has a different threshold energy change based on either the characteristics of the pipe at the microphone or based on training data or both.

As gas or liquid is flowing through the pipe, the energy level determined by the computing device will be relatively constant. Once the gas or liquid stops flowing, the energy level returns to the initial energy levels. While the energy level is constant, the computing device monitors the energy level and stores the elapsed time that the energy level is above the threshold energy change. When the gas or liquid stops flowing, the computing device monitors the energy level will likely determine that the energy level has changed by a second threshold energy change within a second particular amount of time. In some implementations, the second threshold energy change is the same as the threshold energy change when the flow began and in other implementations it is different. In some implementations, the second particular amount of time is the same as the particular amount of time when the flow began and in other implementations it is different. The computing device determines all four values based on the material of the pipe, the outer diameter of the pipe, the inner diameter of the pipe, and the material flowing through the pipe or the training data or both.

In some implementations, the computing device uses a combination of temperature and sound to determine flow through the pipe. For example, the computing device may use temperature to determine when flow begins through the pipe and audio energy levels to determine when flow stops. As another example, the computing device may use audio energy levels to determine when flow beings and temperature to determine when flow ends.

The water meter described in this application may be used in a variety of situations where the user wishes to measure water flow but not install a water meter by removing, cutting, or adding pipes. For example, in a multi-family housing, the management company may wish to measure water consumption for individual units that do not have individual meters. The management company may install these meters by attaching them to the pipes that feed each unit by using glue, tape, zip ties, or any other type of tie or adhesive. Units that are fed by more than one pipe can have a meter attached to each pipe. The meters may be linked to a billing system to generate individual bills for units that previously did not have meters. In some implementations, each meter may include a tamper resistant band that shows evidence of attempted removal. Each meter may also generate an alarm when someone attempts to remove it.

In some implementations, the meters may be configured with vibration sensors. The vibration sensors can detect vibrations in the pipes that occur when water or other material is flowing through the pipes. The meter may include multiple vibration sensors around the circumference of the pipe. The computing device that receives the data from the vibration sensors may determine that water flow rate increases as the water flow increases. In some implementations, the vibrations of the pipe may occur when the material changes its rate of flow. In this instance, the computing device may determine the water flow rate based on the rate of change in the vibrations.

In some implementations, the computing devices determine flow through the pipes based on a combination of sound, temperature, and vibrations. Any combination of the three may be used to detect start of the flow and end of the flow. For example, the computing device may use data from the temperature and vibration sensors to determine when flow starts and use only microphone data to determine when flow stops. As another example, the computing device may use sound, temperature, and vibration data to determine when flow starts and sound and vibration data to determine when flow stops. In some implementations, the ambient temperature, temperature of the material flowing, season, time of day, month, day of the week, etc. may be used to determine which data may be used.

In some implementations, the meter devices attached to the pipes may run on batteries. To save battery power, the devices may be configured to communicate only at certain intervals. For example, the devices may be configured to communicate only on Mondays between noon and 2 pm. During this time, a receiving computing device may request data from each of the meter devices. For the remainder of the week, the meter devices may only collect data from the pipe.

In some implementations, the meters may be configured to generate an alarm that may be audible or delivered to a computing device when the flow surpasses a threshold. For example, the meter may generate an alarm when the meter detects a flowrate above three gallons per minute. As another example, the meter may generate an alarm for different times of the day, day of the week, month, etc. The meter may generate an alarm when the rate is above 0.3 gallons per minute when nobody is likely using water such as during the middle of the day. This functionality may be useful in identifying leaks.

In some implementations, meters may be logically connected to one another. For meters that measure pipes that feed the same living unit, those meters may be configured to share data and then supply one set of data to a computing device. The meters may also share data to generate alarms. The meters may combine their data to determine whether the flow exceeds the threshold. For example, if the threshold his 0.3 gallons per minute then a meter that measures 0.2 gallons per minute may generate an alarm if it is logically connected to another meter that measures 0.2 gallons per minute.

Figure 6:
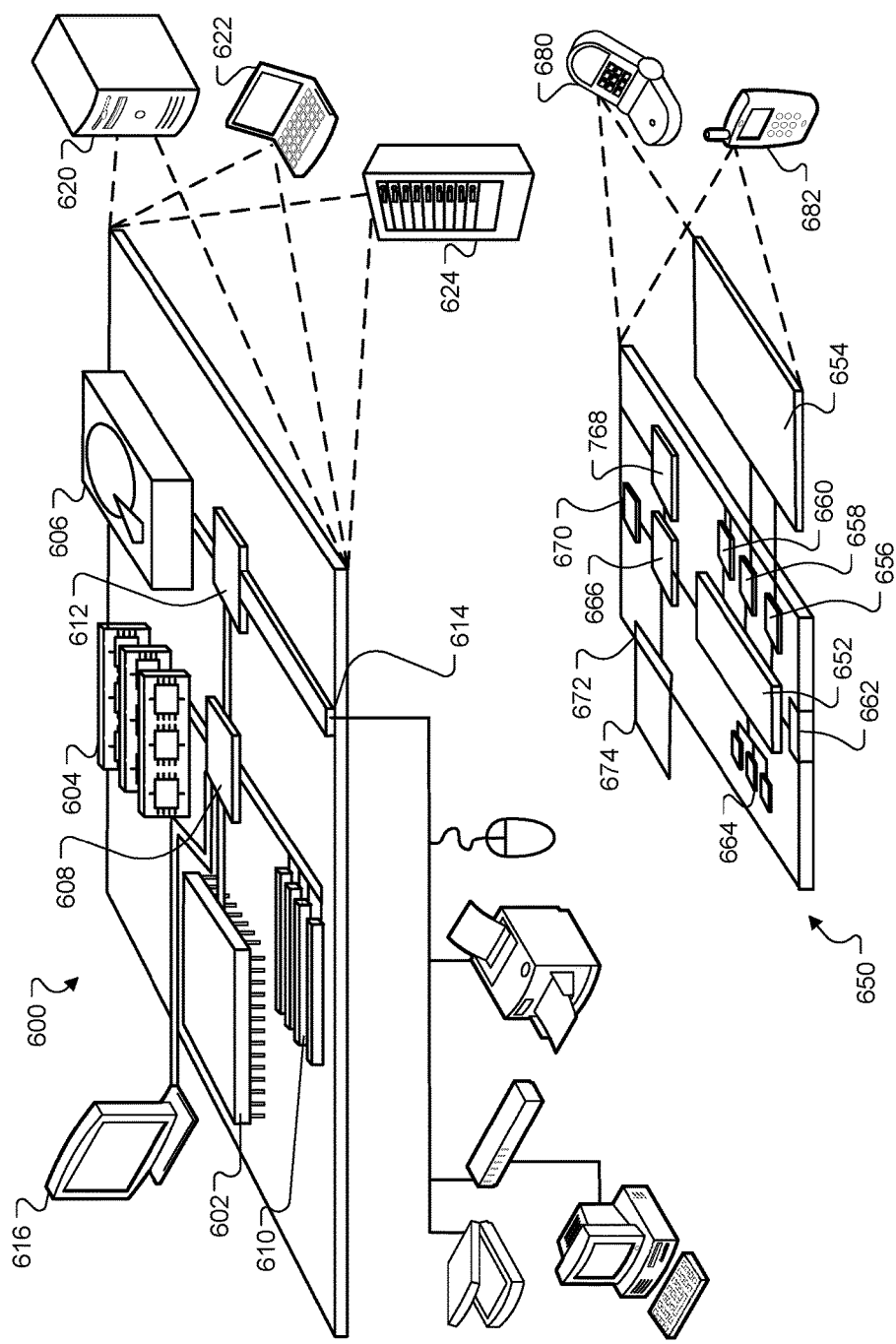
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, from a first meter that is connected to a first pipe, first audio data collected during a time period and first temperature data collected during the time period;
   receiving, from a second meter that is connected to a second pipe, second audio data collected during the time period and second temperature data collected during the time period; and based on the first audio data, the first temperature data, the second audio data, and the second temperature data, determining a first amount of material that has flowed through the first pipe during the time period relative to a second amount of material that has flowed through the second pipe.

2. The method of claim 1, wherein determining a first amount of material that has flowed through the first pipe during the time period relative to a second amount of material that has flowed through the second pipe comprises:
determining that a first temperature of the first pipe has changed by at least a threshold temperature change during a particular amount of time;
determining that a second temperature of the second pipe has changed by at least the threshold temperature change during the particular amount of time;
after determining that the first temperature of the first pipe has changed by at least the threshold temperature change during the particular amount of time, determining a first elapsed time that the first temperature of the first pipe is changing;
after determining that the second temperature of the second pipe has changed by at least the threshold temperature change during the particular amount of time, determining a second elapsed time that the second temperature of the second pipe is changing; and
based on the first elapsed time and the second elapsed time, determining the first amount of material that has flowed through the first pipe during the particular amount of time relative to the second amount of material that has flowed through the second pipe during the particular amount of time.

3. The method of claim 1, wherein determining a first amount of material that has flowed through the first pipe during the time period relative to a second amount of material that has flowed through the second pipe comprises:
based on the first audio data, determining a first level of first audio energy that corresponds to the first audio data;
based on the second audio data, determining a second level of second audio energy that corresponds to the second audio data;
determining that the first level of first audio energy has changed by at least a threshold energy change during the particular amount of time;
determining that the second level of audio energy has changed by at least the threshold energy change during the particular amount of time;
after determining that the first level of first audio energy has changed by at least the threshold energy change during the particular amount of time, determining a first elapsed time that the first level of the first audio energy has changed by at least the threshold energy change;
after determining that the second level of second audio energy has changed by at least the threshold energy change during the particular amount of time, determining a second elapsed time that the second level of the second audio energy has changed by at least the threshold energy change; and
based on the first elapsed time and the second elapsed time, determining the first amount of material that has flowed through the first pipe during the particular amount of time relative to the second amount of material that has flowed through the second pipe during the particular amount of time.

4. The method of claim 1, wherein the first pipe and the second pipe are water pipes and the material is water.

5. The method of claim 1, wherein the first pipe and the second pipe are gas pipes and the material is natural gas or propane.

6. The method of claim 1, comprising:
transmitting a request for meter data,
wherein the first and second audio data and the first and second temperature data are received in response to the request for meter data.

7. The method of claim 1, comprising:
receiving, from the first meter, data indicating that the first meter moved during the time period; and
in response to receiving the data indicating that the first meter moved during the time period, providing, for display, data indicating movement of the first meter.

8. The method of claim 1, comprising:
receiving, from a third meter that is connected to a third pipe that feeds into the first pipe and the second pipe, flow data collected during the time period; and
based on the first amount of material that has flowed through the first pipe during the time period relative to the second amount of material that has flowed through the second pipe and based on the flow data from the third meter, determining a first absolute amount of material that has flowed through the first pipe during the time period and a second absolute amount of material that has flowed through the second pipe during the time period.

9. A system comprising:
one or more computers; and
one or more storage devices storing instructions that are operable, when executed by the one or more computers, to cause the one or more computers to perform operations comprising:
receiving, from a first meter that is connected to a first pipe, first audio data collected during a time period and first temperature data collected during the time period;
receiving, from a second meter that is connected to a second pipe, second audio data collected during the time period and second temperature data collected during the time period; and
based on the first audio data, the first temperature data, the second audio data, and the second temperature data, determining a first amount of material that has flowed through the first pipe during the time period relative to a second amount of material that has flowed through the second pipe.

10. The system of claim 9, wherein determining a first amount of material that has flowed through the first pipe during the time period relative to a second amount of material that has flowed through the second pipe comprises:
determining that a first temperature of the first pipe has changed by at least a threshold temperature change during a particular amount of time;
determining that a second temperature of the second pipe has changed by at least the threshold temperature change during the particular amount of time;
after determining that the first temperature of the first pipe has changed by at least the threshold temperature change during the particular amount of time, determining a first elapsed time that the first temperature of the first pipe is changing;
after determining that the second temperature of the second pipe has changed by at least the threshold temperature change during the particular amount of time, determining a second elapsed time that the second temperature of the second pipe is changing; and based on the first elapsed time and the second elapsed time, determining the first amount of material that has flowed through the first pipe during the particular amount of time relative to the second amount of material that has flowed through the second pipe during the particular amount of time.

11. The system of claim 9, wherein determining a first amount of material that has flowed through the first pipe during the time period relative to a second amount of material that has flowed through the second pipe comprises:
  based on the first audio data, determining a first level of first audio energy that corresponds to the first audio data;
  based on the second audio data, determining a second level of second audio energy that corresponds to the second audio data;
  determining that the first level of first audio energy has changed by at least a threshold energy change during the particular amount of time;
  determining that the second level of audio energy has changed by at least the threshold energy change during the particular amount of time;
  after determining that the first level of first audio energy has changed by at least the threshold energy change during the particular amount of time, determining a first elapsed time that the first level of the first audio energy has changed by at least the threshold energy change;
  after determining that the second level of second audio energy has changed by at least the threshold energy change during the particular amount of time, determining a second elapsed time that the second level of the second audio energy has changed by at least the threshold energy change; and
  based on the first elapsed time and the second elapsed time, determining the first amount of material that has flowed through the first pipe during the particular amount of time relative to the second amount of material that has flowed through the second pipe during the particular amount of time.

12. The system of claim 9, wherein the first pipe and the second pipe are water pipes and the material is water.

13. The system of claim 9, wherein the first pipe and the second pipe are gas pipes and the material is natural gas or propane.

14. The system of claim 9, wherein the operations further comprise:
  transmitting a request for meter data,
  wherein the first and second audio data and the first and second temperature data are received in response to the request for meter data.

15. The system of claim 9, wherein the operations further comprise:
  receiving, from the first meter, data indicating that the first meter moved during the time period; and
  in response to receiving the data indicating that the first meter moved during the time period, providing, for display, data indicating movement of the first meter.

16. The system of claim 9, wherein the operations further comprise:
  receiving, from a third meter that is connected to a third pipe that feeds into the first pipe and the second pipe, flow data collected during the time period; and
  based on the first amount of material that has flowed through the first pipe during the time period relative to the second amount of material that has flowed through the second pipe and based on the flow data from the third meter, determining a first absolute amount of material that has flowed through the first pipe during the time period and a second absolute amount of material that has flowed through the second pipe during the time period.

17. A non-transitory computer-readable medium storing software comprising instructions executable by one or more computers which, upon such execution, cause the one or more computers to perform operations comprising:
  receiving, from a first meter that is connected to a first pipe, first audio data collected during a time period and first temperature data collected during the time period;
  receiving, from a second meter that is connected to a second pipe, second audio data collected during the time period and second temperature data collected during the time period; and
  based on the first audio data, the first temperature data, the second audio data, and the second temperature data, determining a first amount of material that has flowed through the first pipe during the time period relative to a second amount of material that has flowed through the second pipe.

18. The medium of claim 17, wherein determining a first amount of material that has flowed through the first pipe during the time period relative to a second amount of material that has flowed through the second pipe comprises:
  determining that a first temperature of the first pipe has changed by at least a threshold temperature change during a particular amount of time;
  determining that a second temperature of the second pipe has changed by at least the threshold temperature change during the particular amount of time;
  after determining that the first temperature of the first pipe has changed by at least the threshold temperature change during the particular amount of time, determining a first elapsed time that the first temperature of the first pipe is changing;
  after determining that the second temperature of the second pipe has changed by at least the threshold temperature change during the particular amount of time, determining a second elapsed time that the second temperature of the second pipe is changing; and
  based on the first elapsed time and the second elapsed time, determining the first amount of material that has flowed through the first pipe during the particular amount of time relative to the second amount of material that has flowed through the second pipe during the particular amount of time.

19. The medium of claim 17, wherein determining a first amount of material that has flowed through the first pipe during the time period relative to a second amount of material that has flowed through the second pipe comprises:
  based on the first audio data, determining a first level of first audio energy that corresponds to the first audio data;
  based on the second audio data, determining a second level of second audio energy that corresponds to the second audio data;
  determining that the first level of first audio energy has changed by at least a threshold energy change during the particular amount of time;
  determining that the second level of audio energy has changed by at least the threshold energy change during the particular amount of time;
  after determining that the first level of first audio energy has changed by at least the threshold energy change during the particular amount of time, determining a first elapsed time that the first level of the first audio energy has changed by at least the threshold energy change;

after determining that the second level of second audio energy has changed by at least the threshold energy change during the particular amount of time, determining a second elapsed time that the second level of the second audio energy has changed by at least the threshold energy change; and based on the first elapsed time and the second elapsed time, determining the first amount of material that has flowed through the first pipe during the particular amount of time relative to the second amount of material that has flowed through the second pipe during the particular amount of time.

20. The medium of claim 17, wherein the operations further comprise:

receiving, from a third meter that is connected to a third pipe that feeds into the first pipe and the second pipe, flow data collected during the time period; and based on the first amount of material that has flowed through the first pipe during the time period relative to the second amount of material that has flowed through the second pipe and based on the flow data from the third meter, determining a first absolute amount of material that has flowed through the first pipe during the time period and a second absolute amount of material that has flowed through the second pipe during the time period.

\* \* \* \* \*